United States Patent [19]

Arai

[11] Patent Number: 4,735,496
[45] Date of Patent: Apr. 5, 1988

[54] FIVE-ELEMENT COPYING ZOOM LENS SYSTEM

[75] Inventor: Yasunori Arai, Tokyo, Japan

[73] Assignee: Asahi Kogaku Kogyo Kabushiki Kaisha, Tokyo, Japan

[21] Appl. No.: 10,593

[22] Filed: Feb. 3, 1987

[30] Foreign Application Priority Data

Feb. 3, 1986 [JP] Japan .................................. 61-22431

[51] Int. Cl.$^4$ ........................... G02B 15/00; G02B 9/60
[52] U.S. Cl. .................................................... 350/425
[58] Field of Search .......................................... 350/425

[56] References Cited

U.S. PATENT DOCUMENTS 4,359,269 11/1982 Itoh ...................................... 350/425

Primary Examiner—John K. Corbin
Assistant Examiner—Rebecca D. Gass
Attorney, Agent, or Firm—Sughrue, Mion, Zinn, Macpeak, and Seas

[57] ABSTRACT

A copying zoom lens system consisting of five lens elements. The first and fifth lens elements are each a single negative lens element with a negative focal length. The middle three lens elements are grouped into a central lens unit of positive focal length. The central lens unit has a positive biconvex lens surrounded by two meniscus lenses having their concave surface directed to the biconvex lens. Zooming is achieved by moving the first and fifth lens elements with respect to the central lens unit as well as by moving the overall lens system between fixed image and object planes.

15 Claims, 20 Drawing Sheets

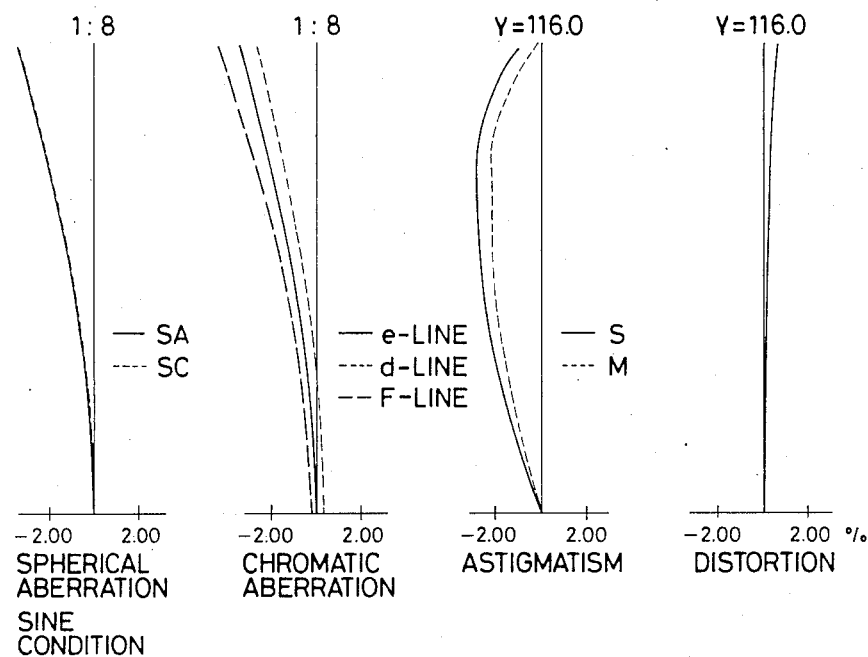
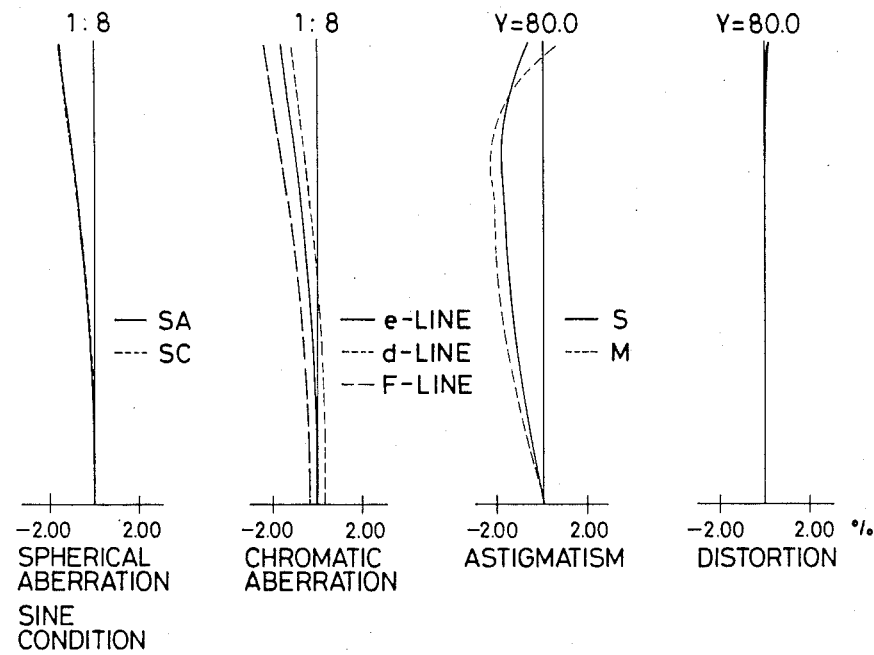

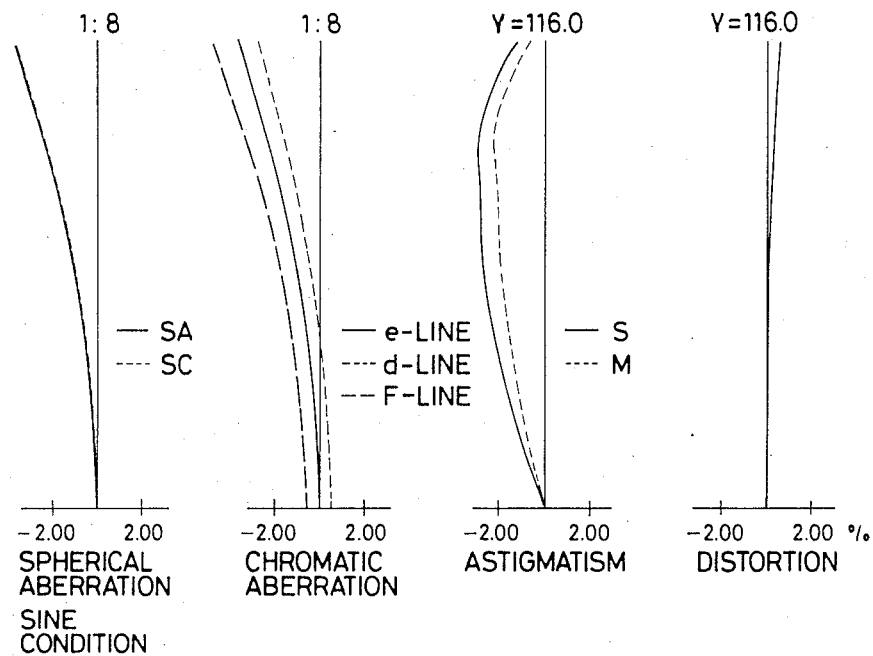
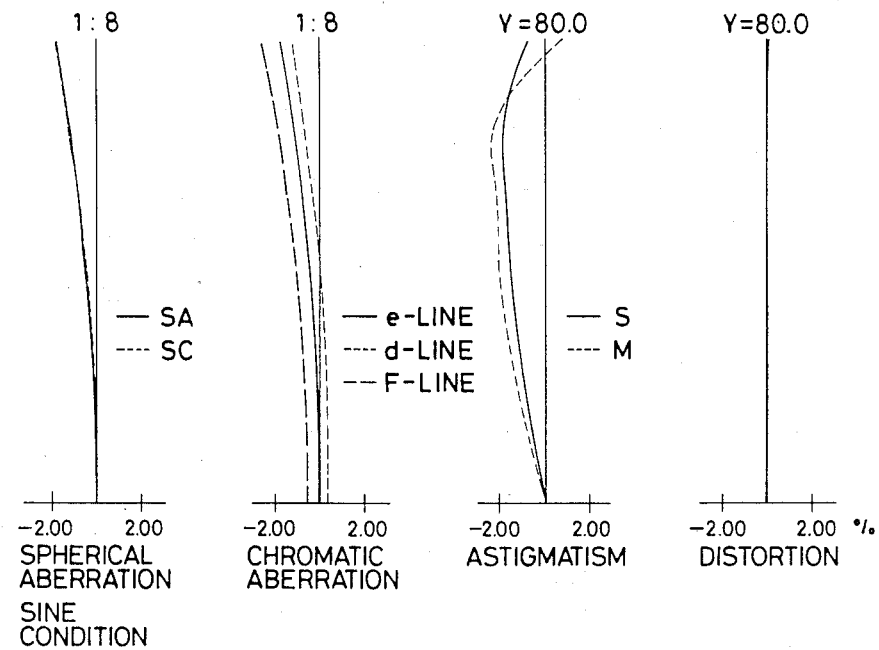

FIVE-ELEMENT COPYING ZOOM LENS SYSTEM

BACKGROUND OF THE INVENTION

Field of the Invention

The present invention relates to a copying zoom lens system that is capable of zooming with the object-to-image distance being held constant and which hence is suitable for use in the optics of a copying machine.

2. Background of the Invention

Descriptions of a copying zoom lens system of the three-lens-unit type contemplated by the present invention are disclosed in Unexamined Published Japanese Patent Application Nos. 67909/1982 and 121414/1985. The systems taught in these applications consist of 8 to 10 lens elements and attain half viewing angles of the order of 18°. Since these system are expensive and require a long object-to-image distance, they are not capable of fully meeting the requirements of modern copying machines for lower cost and smaller size.

The assignee of the present application previously filed Japanese Patent Application No. 26419/1984 in which they proposed a copying zoom lens system that was intended to satisfy the requirements for smaller size and lower cost. This system is of the seven-element configuration and encompasses a half viewing angle of the order of 25°. However, even this system is not completely satisfactory since the half viewing angle that can be attained is not on the order of 30°. Furthermore, its configuration wherein the second and third lens elements are made separate from the fifth and sixth elements is prone to misalignment between the axes of lens elements being assembled.

SUMMARY OF THE INVENTION

An object, therefore, of the present invention is to provide a copying zoom lens system that achieves a zoom ratio of at least two (i.e., a magnification change from $-1.25\times$ to $-0.6\times$) while providing an F-number of 1:7 to 1:8 and a half viewing angle of the order of 20°-30° and which yet satisfies the requirements for smaller size and lower cost by employing a very simple five-element configuration.

The invention can be summarized as a copying zoom lens system consisting of five lens elements. The first and fifth lens elements are each a single negative lens element with a negative focal length. The middle three lens elements are grouped into a central lens unit of positive focal length. The central lens unit has a positive biconvex lens surrounded by two meniscus lenses having their concave surfaces directed to the biconvex lens. Zooming is achieved by moving the first and fifth lens elements with respect to the central lens unit as well as by moving the overall lens system between fixed image and object planes.

BRIEF DESCRIPTION OF THE DRAWINGS

FIGS. 3, 7, 11, 15, 19, 23, 27, 31, 35 and 39 are graphs plotting aberrational curves of zoom lens systems for a magnification of $-1.25\times$ according to Examples 1 to 10.

FIGS. 4, 8, 12, 16, 20, 24, 28, 32, 36 and 40 are graphs plotting aberration curves of zoom lens systems for a magnification of $-1.60\times$ according to Examples 1 to 10.

DETAILED DESCRIPTION OF THE PREFERRED EMBODIMENTS

Figure 1:
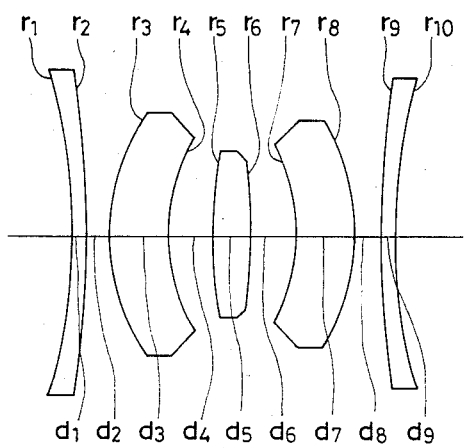
FIGS. 1, 5, 9, 13, 17, 21, 25, 29, 33 and 37 are simplified cross-sectional views of zoom lens systems for a magnification of $-1\times$ according to Examples 1 to 10.
Figure 2:
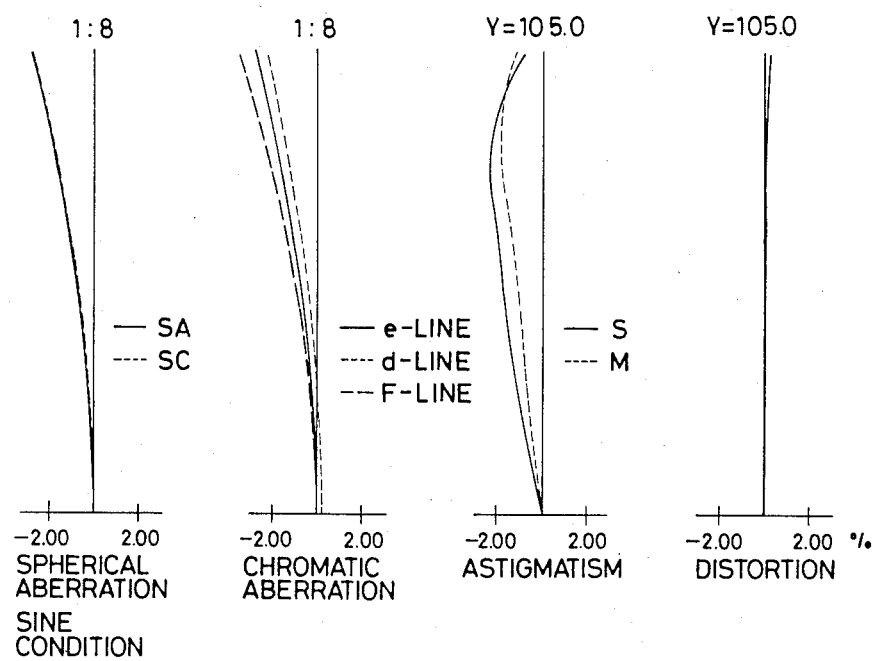
FIGS. 2, 6, 10, 14, 18, 22, 26, 30, 34 and 38 are graphs plotting aberration curves of zoom lens systems for a magnification of $-1\times$ according to Examples 1 to 10.

In its general aspect, the present invention provides a copying zoom lens system that comprises, in order from an object side, a first lens unit having a negative focal length, a second lens unit having a positive focal length and a third lens unit having a negative focal length. This copying lens achieves zooming not only by changing the distance between the first and second lens units and the distance between the second and third lens units but also by displacing the overall system with the distance between the object plane and the image plane being held constant. This copying zoom lens system is characterized in that each of the first and third lens units is composed of a single negative lens element, the second lens unit is composed of a centrally disposed positive biconvex lens element that is sandwiched between two meniscus lens elements each having its concave surface directed toward the center, and the overall system has a five-group five-element configuration.

In one preferred embodiment of the present invention, the first lens unit is composed of a negative meniscus lens element that has its concave surface directed toward the object side, the third lens unit is composed of a negative meniscus lens element that has its concave surface directed toward the image side. Furthermore, the first and third lens units each satisfy the following condition (1):

$$\nu_1, \nu_5 < 40 \tag{1}$$

where $\nu_1$ and $\nu_5$ are the Abbe numbers of the optical materials of which the first and third lens units are respectively made.

In another preferred embodiment, the first and third lens units satisfy the following conditions (2) and (3):

$$1.0f < |f_1|, |f_5| < 2.5f \ (f_1, f_5 < 0) \tag{2}$$

$$-0.70 < r_1/f, \ -r_{10}/f < -0.37 \tag{3}$$

where f is the focal length of the overall system for a magnification of $-1.0\times$; $f_1$ is the focal length of the first lens unit; $f_5$ is the focal length of the third lens unit; $r_1$ is the radius of curvature of the surface in the first lens unit which is on the object side; and $r_{10}$ is the radius of curvature of the surface in the third lens unit which is on the image side.

In still another preferred embodiment, the second lens unit satisfies the following conditions (4) to (6):

$$\nu_3 > 46 \tag{4}$$

$$0.45f > f_3 > 0.30f \tag{5}$$

$$1.30 > r_3/r_4, \ r_8/r_7 > 1.05 \tag{6}$$

where $\nu_3$ and $f_3$ signify the Abbe number and focal length, respectively, of the positive biconvex lens element; $r_3$ and $r_4$ signify the radii of curvature of the surfaces on the object and image sides, respectively, of the meniscus lens element that is disposed on the object side of the biconvex lens element; and $r_7$ and $r_8$ signify the radii of curvature of the surfaces on the object and image sides, respectively, of the meniscus lens element that is disposed on the image side of the biconvex lens element.

The most important feature of the zoom lens system of the present invention is that is employs a five-element configuration for a lens arrangement consisting of three units, negative, positive and negative, and that the second lens unit is composed of a three-element configuration which is the minimum necessary requirement for constructing a wide-angle lens system that encompasses a half viewing angle of up to 30°.

Conditions (1) to (3) relate to the negative first and third lens units. Condition (1) represents the requirement that should be met by the first and third lens units for achieving proper compensation of chromatic aberration. In accordance with the present invention, the second lens unit has a large positive power and is composed of two small a number of elements to achieve adequate compensation of chromatic aberration by means of the second unit alone. To solve this problem, it is required that each of the first and third lens units be made of an optical material that satisfies condition (1). If the upper limit of this condition is exceeded, the ability of the negative first and third units to overcompensate chromatic aberration becomes insufficient to cancel the under compensating effect of the second lens unit and as undesirably large chromatic aberration will remain.

Condition (2) represents the requirement that should be met by the power of each of the first and third lens units. If this condition is met, these lens units are provided with such a proper amount of power that effective compensation of aberrations can be achieved by combination with the positive second lens unit and that the change in the distance between lens units that is required during zooming is reduced to a reasonably small amount. If the upper limit of condition (2) is exceeded, the first and third lens units are incapable of achieving the intended compensation of astigmatism and curvature of field. Furthermore, the distance between lens units must be changed by such a large amount that the desired compact lens system is not attainable. If the lower limit of condition (2) is not reached, the power of the second lens element (the element in the second lens unit that is disposed on the object side) becomes excessive and over-compensation of astigmatism will result.

Condition (3) represents the requirements that should be met by the radii of curvature of concave surfaces in the negative first and third lens units in order to achieve balanced compensation of coma aberration and astigmatism. If the upper limit of condition (3) is exceeded or its lower limit is not reached, increased astigmatism will occur and it becomes difficult to achieve a balance between sagittal and meridional image planes.

Conditions (4) and (5) relate to the positive third lens element (the biconvex lens centrally positioned in the second lens unit). The second lens unit has a strong positive power and imparts a particularly great power for the third lens element. Condition (4) represents the requirement that should be satisfied in order to minimize the residual chromatic aberration that would occur within the second lens unit. If both of this condition and condition (1) are satisfied, efficient compensation of chromatic aberration can be achieved. If the lower limit of condition (4) is not reached, the under-compensation of chromatic aberration achieved by the third lens element becomes too excessive for the other lens units to attain the proper compensation.

Since the third lens element is a positive biconvex lens, it has on both of its surfaces large amounts of spherical aberration and astigmatism of the same sign, as well as a large coefficient of the Petzval sum. Therefore, if this lens is provided with an appropriate amount of power that is obtained by satisfying condition (5), a balance can be attained between the aberrational correction of this lens and that of the other lenses. However, if the upper limit of condition (5) is exceeded, difficulty is encountered in correcting the astigmatism. Efficient aberrational correction is also unattainable if the lower limit of condition (5) is not reached because not only is the Petzval sum increased but also the spherical aberration is greatly undercompensated.

Condition (6) relates to the second lens element (i.e., the lens in the second lens unit that is disposed on the object side) and the fourth lens element (i.e., the lens in the second lens unit that is positioned on the image side). Neither of the second and fourth lenses have a large lens power but the first and second planes of each lens have large plane powers because of their small radii of curvature. The primary function of these lenses is to compensate for spherical and coma aberrations and for the Petzval sum by means of utilizing the difference between their plane powers and by arranging the first and second planes of each of the second and fourth lenses concentrically with the third lens. Condition (6) represents the requirement that should be satisfied in order to provide the desired differential plane power. If the upper limit of this condition is exceeded, the spherical aberration becomes greatly overcompensated. If, on the other hand, the lower limit of this condition is not reached, not only the spherical aberration but also the astigmatism is undercompensated and the Petzval sum is increased.

A further advantage will be obtained by forming both the positive second and fourth lenses of a high-refractive-index optical material ($n \geq 1.68$) because this permits the fabrication of individual lens surfaces with large radii of curvature or enables even better compensation of aberrations. In addition, if the configurations of all of the lens elements included in the system of the present invention are made symmetrical, there is provided not only a greater ease of lens fabrication and more adaptability to high-volume production abut also a further reduction in distortion. All of these features combine to contribute to the fabrication of a low-cost copying zoom lens system.

Ten examples of the zoom lens system of the present invention are shown below. In Examples 1 to 5, the F-number is 1:8, and in Examples 6 to 10, the F-number is 1:7.

In each of the Examples, f signifies the focal length of the overall system for a magnification of $-1.0\times$; $r_i$ represents the radius of curvature of the i-th surface as counted from the object side; $d_i$ is the aerial distance between the i-th and (i+1)-th planes whether through a lens element or through air and $n_i$ and $\nu_1$ represent the refractive index and Abbe number, respectively, of the i-th lens as counted from the object side.

Accompanying each of the ten examples are a set of four figures, the sets of four being numbered in the same sequence as the examples.

Figure 5:
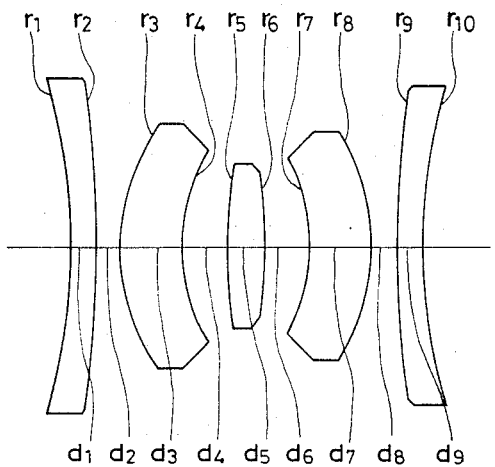
Figure 6:
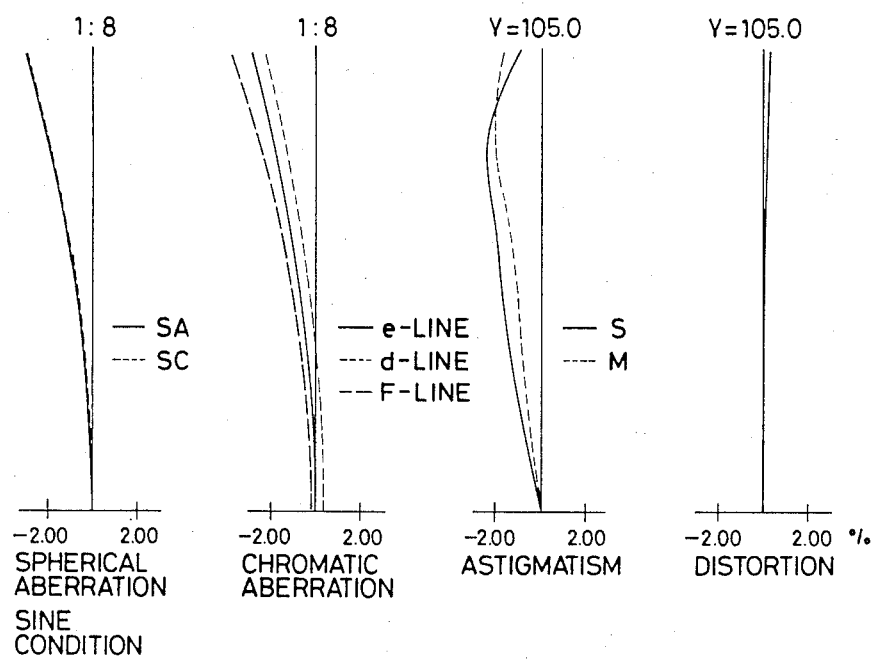
Figure 7:
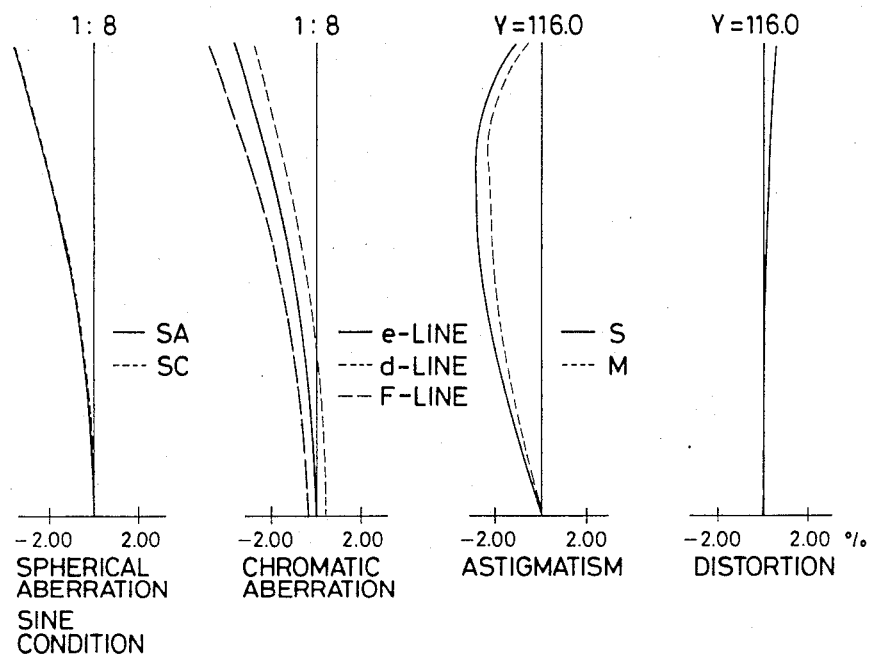
Figure 8:
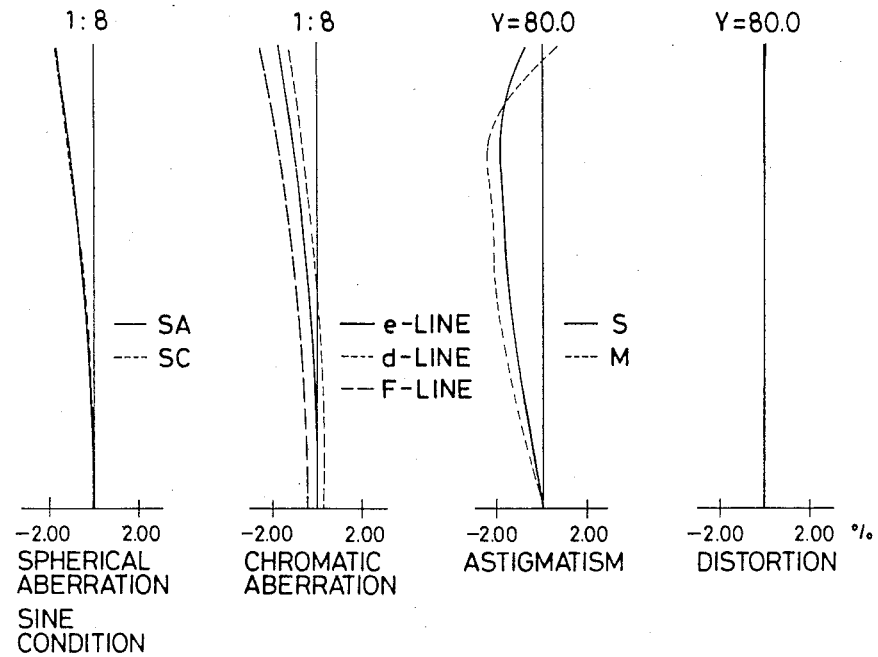
Figure 9:
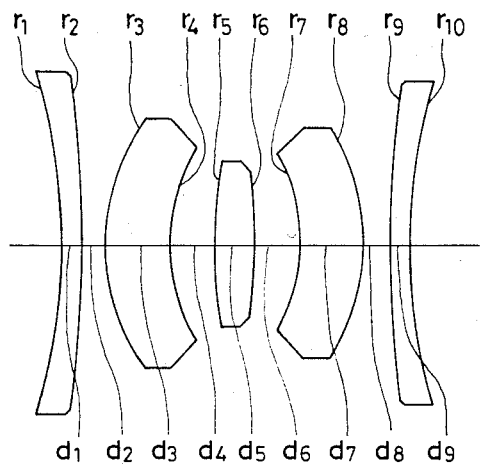
Figure 10:
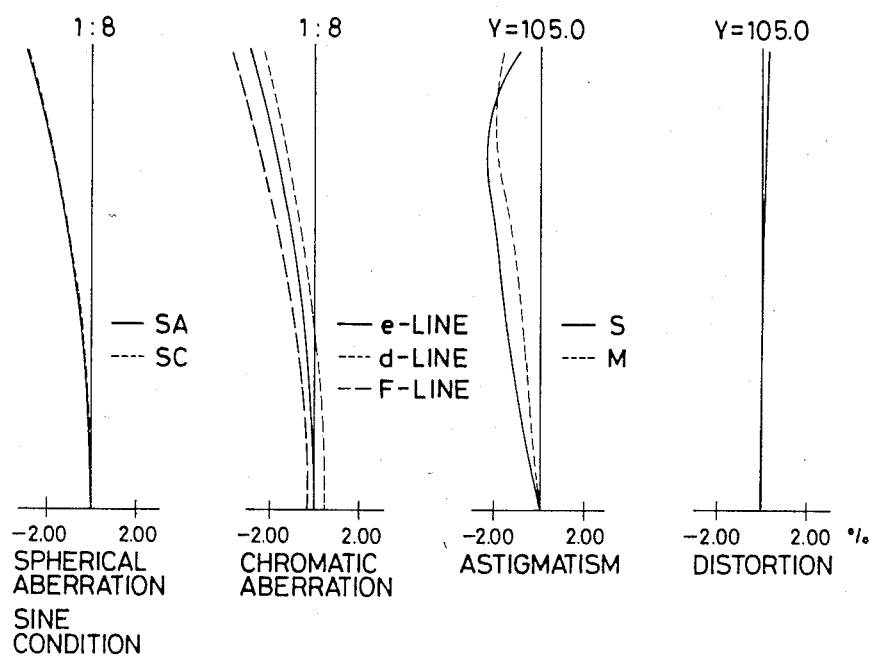
Figure 13:
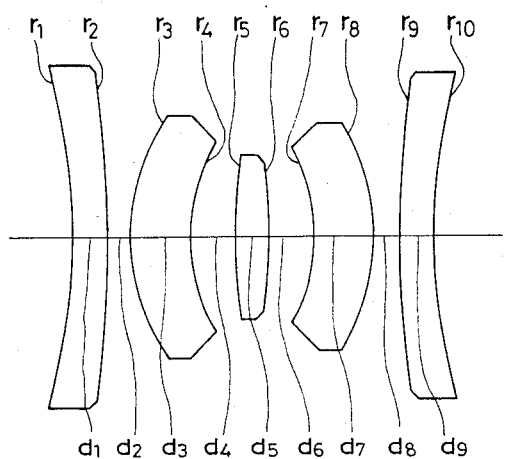
Figure 14:
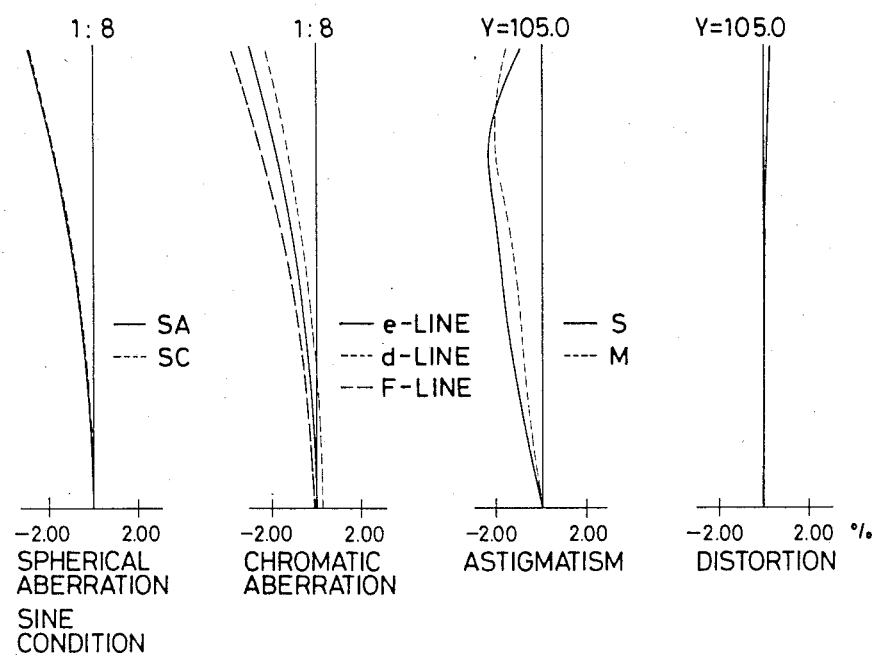
Figure 15:
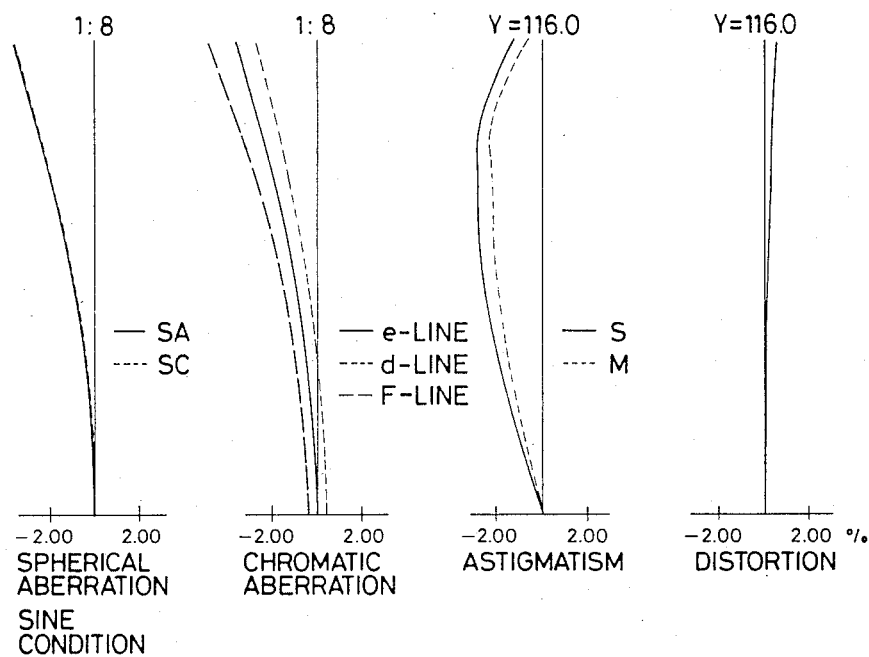
Figure 16:
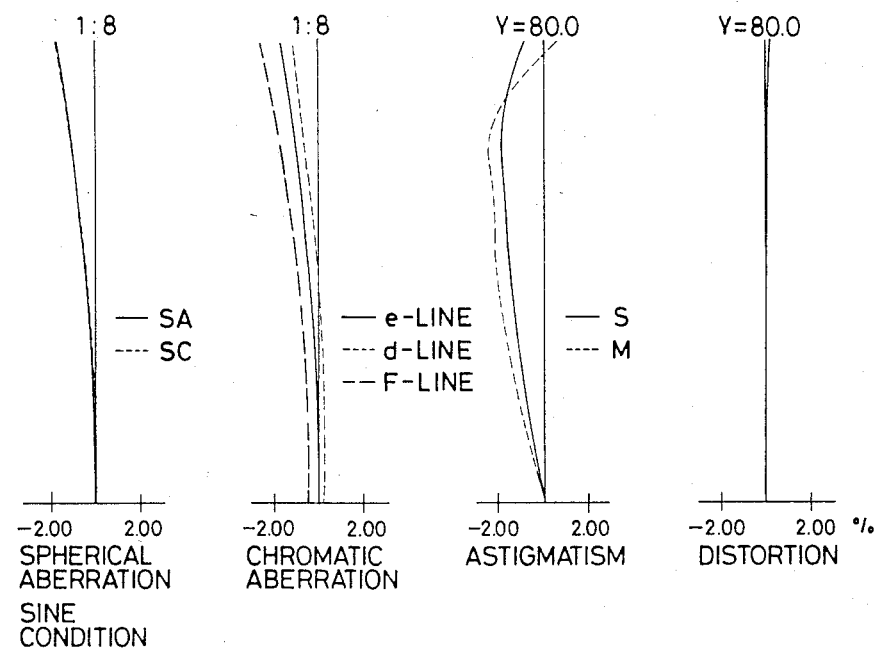
Figure 17:
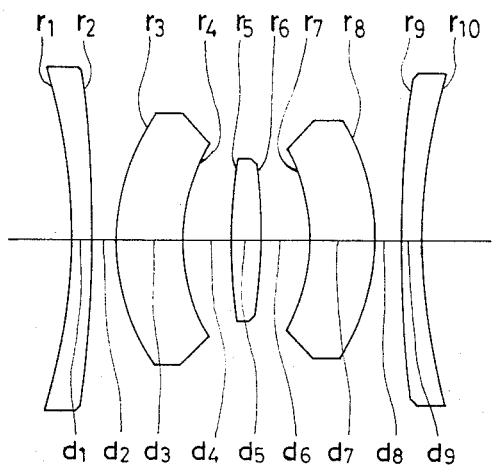
Figure 18:
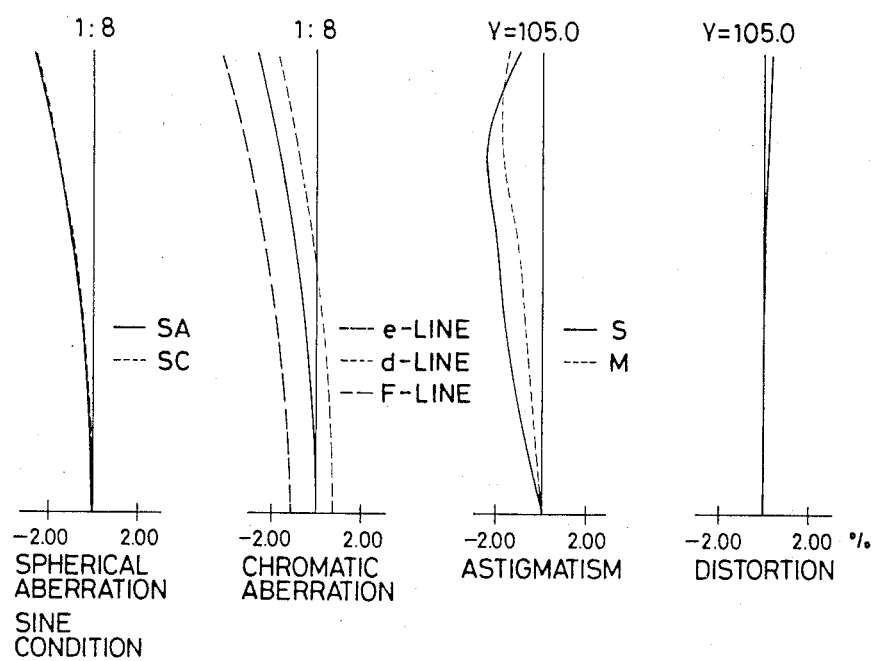
Figure 19:
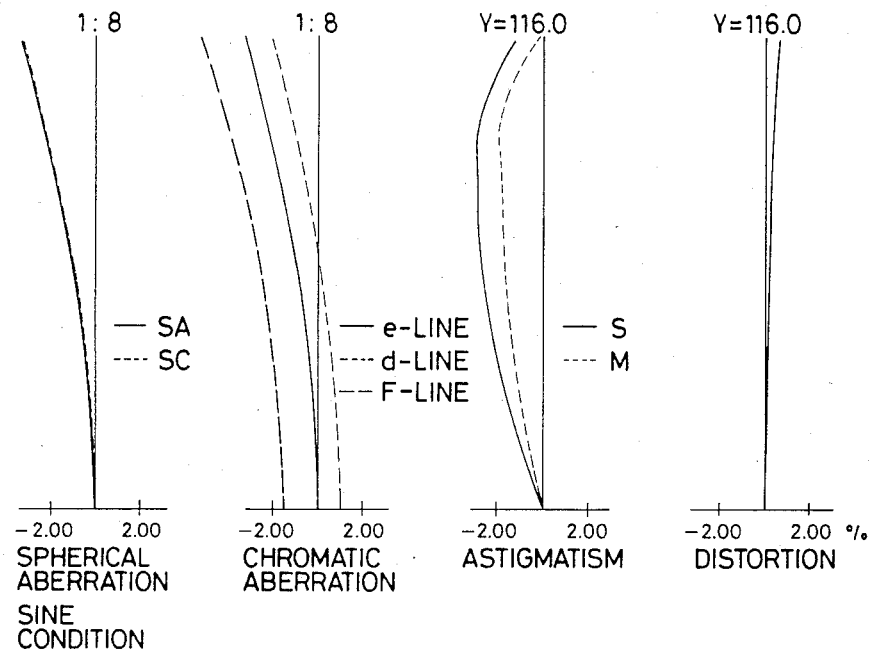
Figure 20:
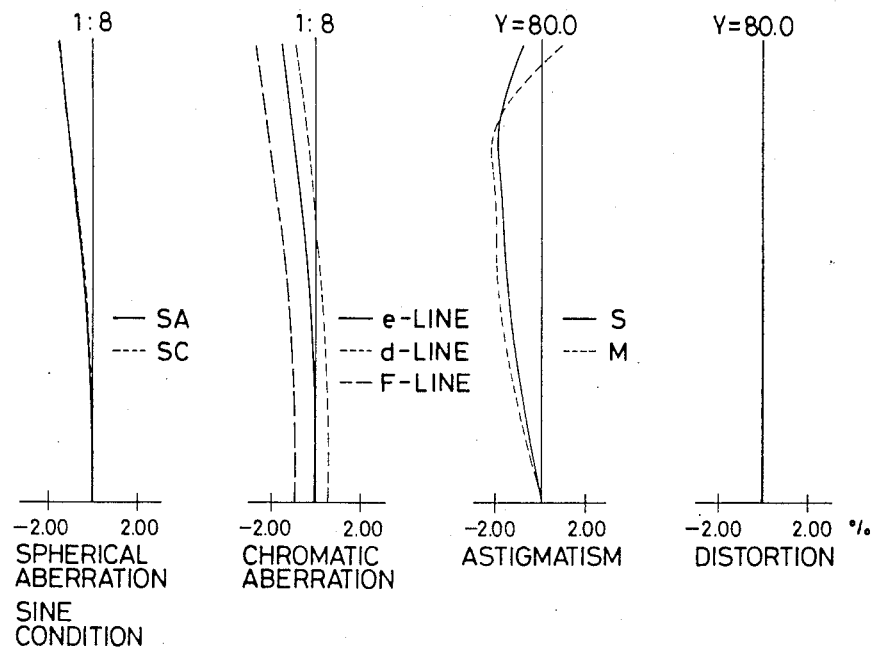
Figure 21:
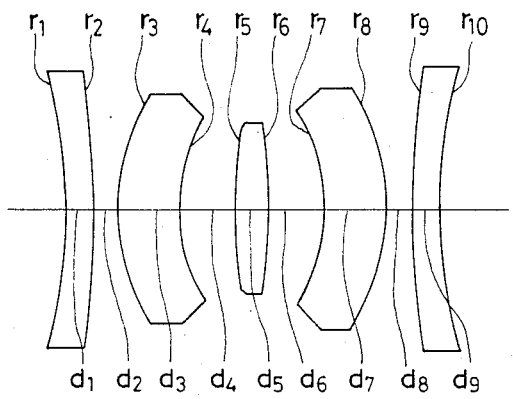
Figure 22:
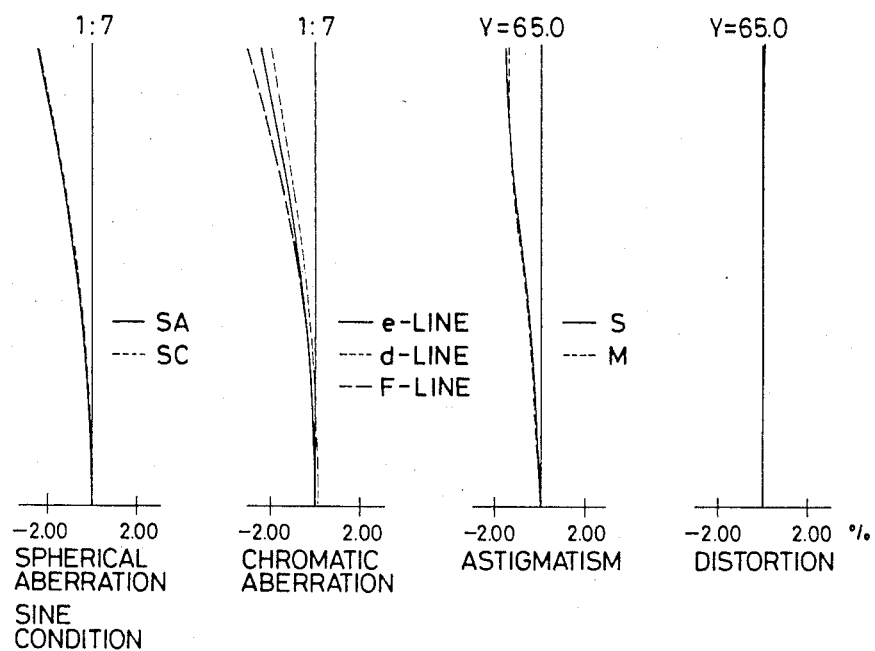
Figure 23:
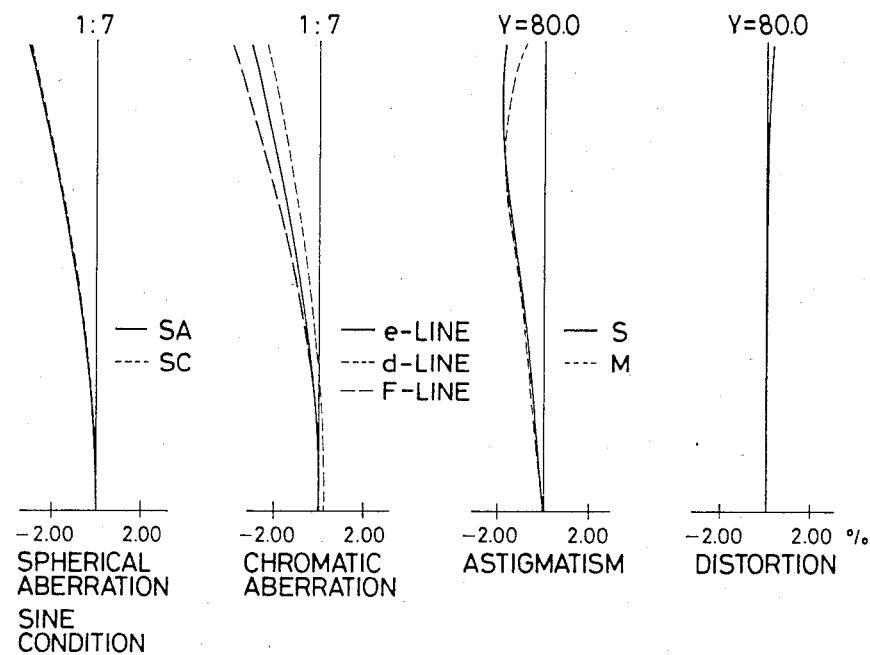
Figure 24:
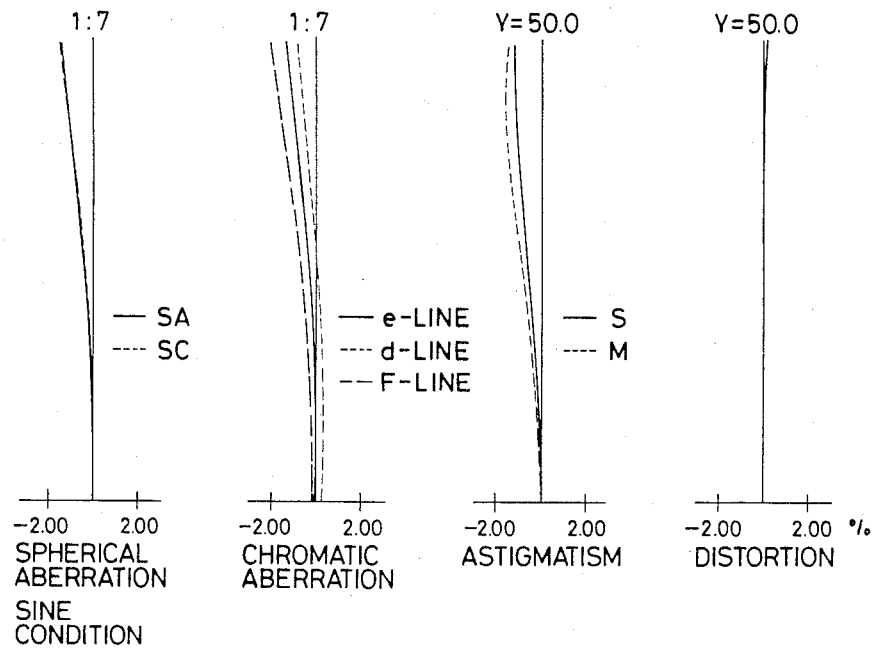
Figure 25:
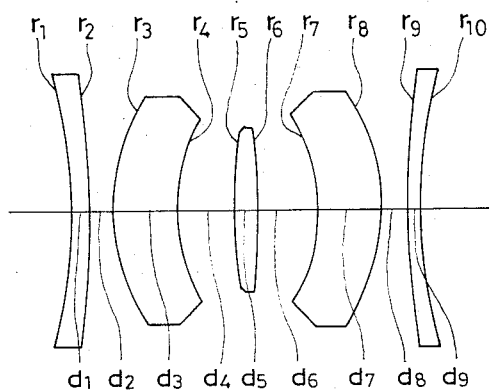
Figure 26:
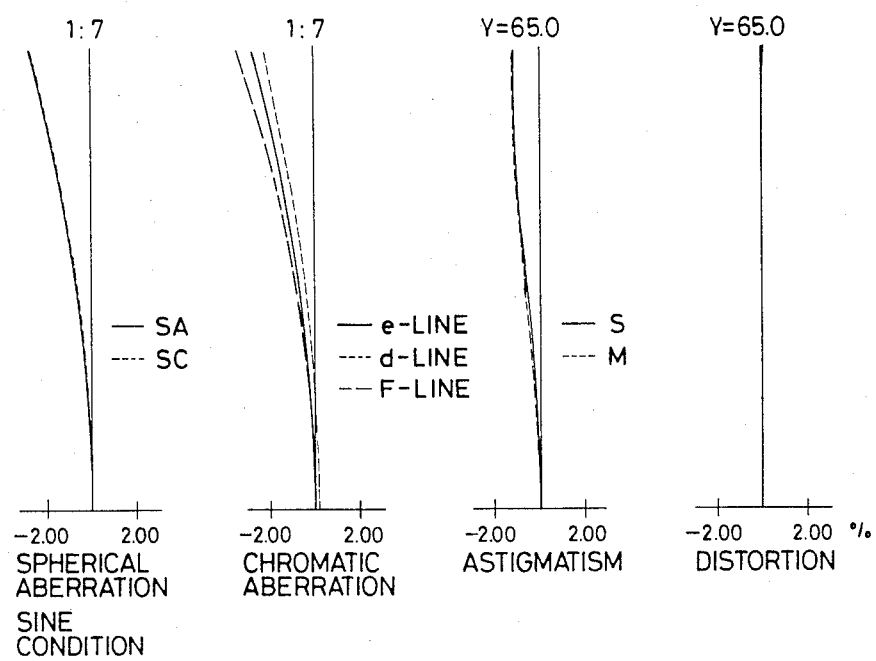
Figure 27:
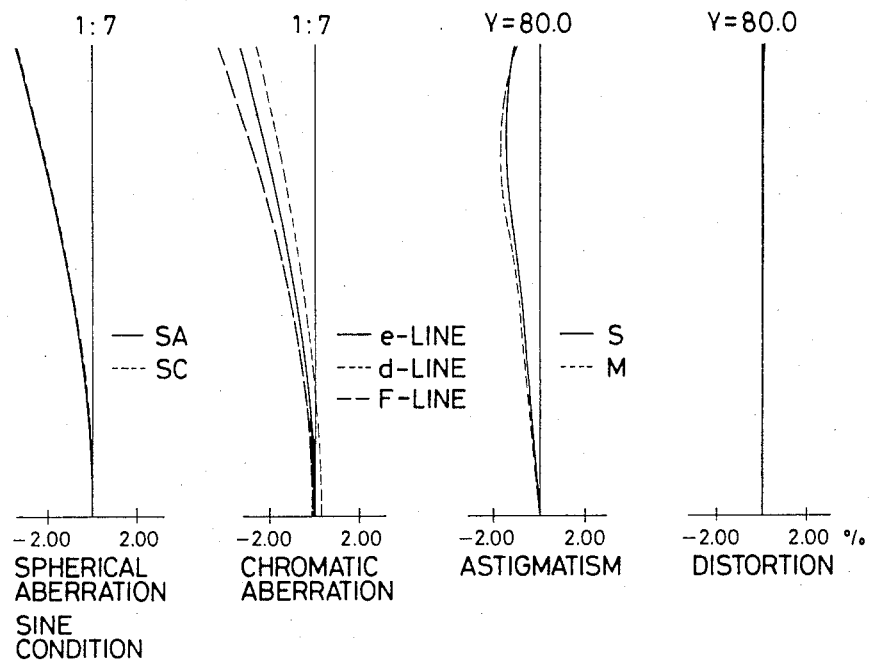
Figure 28:
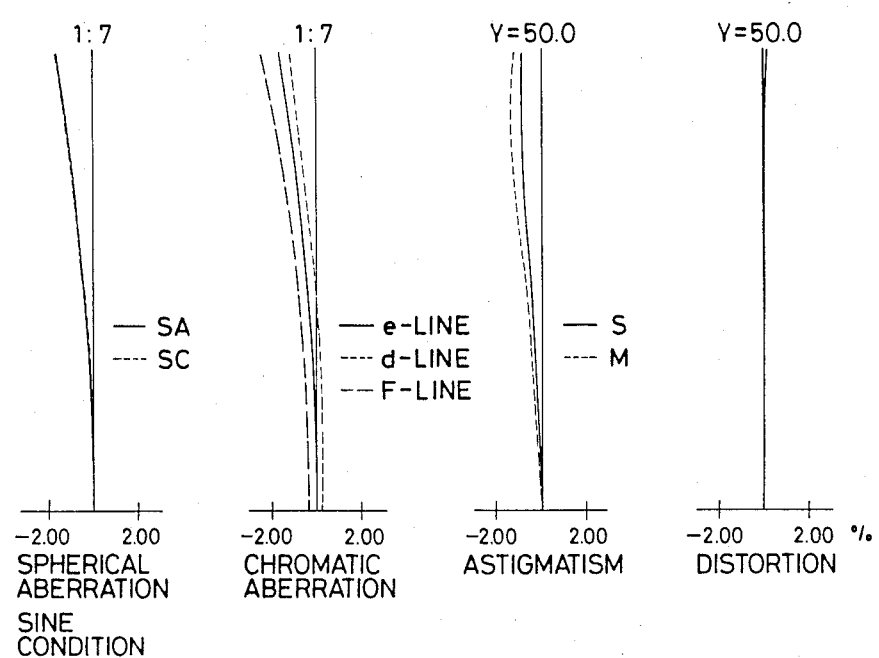
Figure 29:
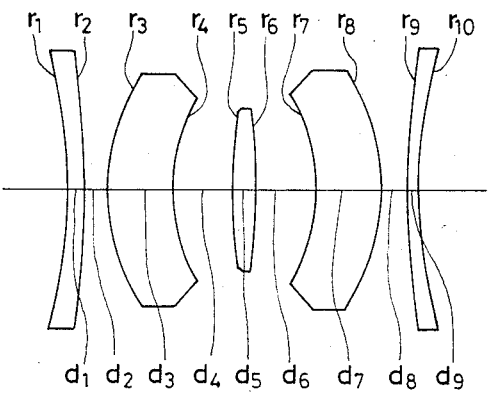
Figure 30:
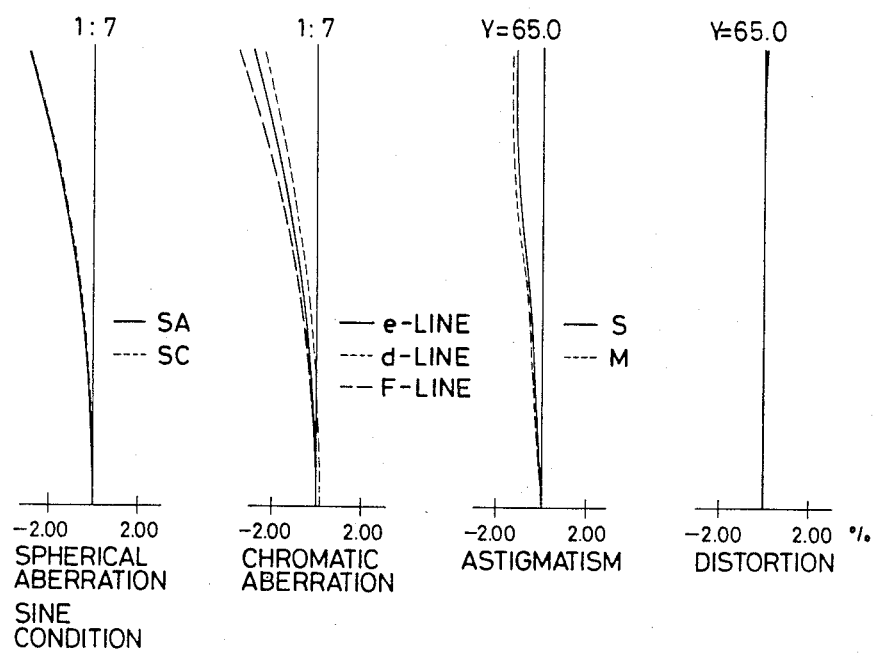
Figure 31:
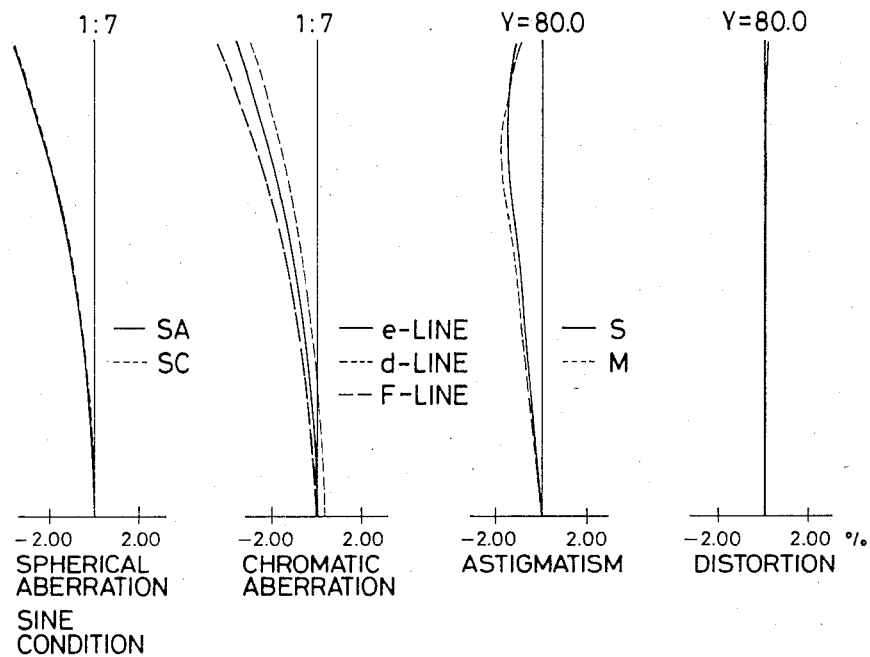
Figure 32:
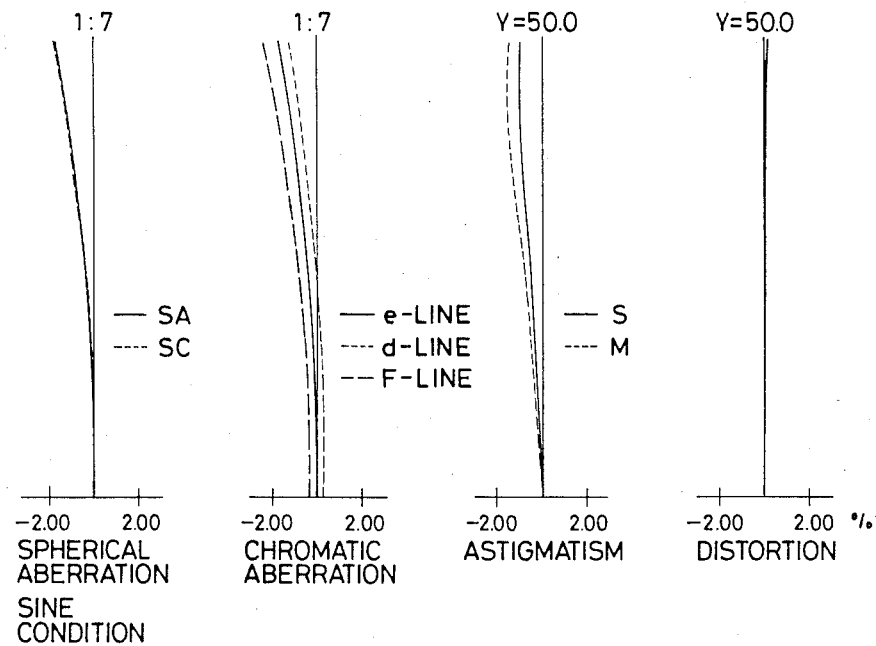
Figure 33:
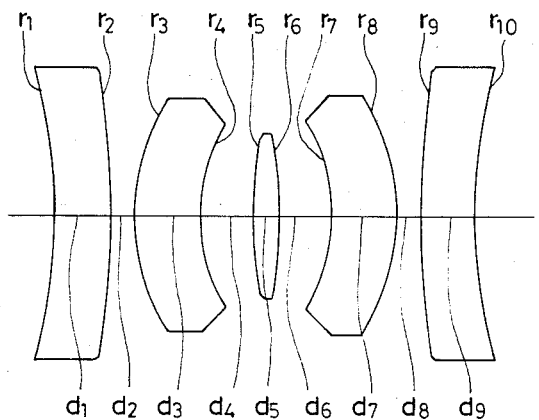
Figure 34:
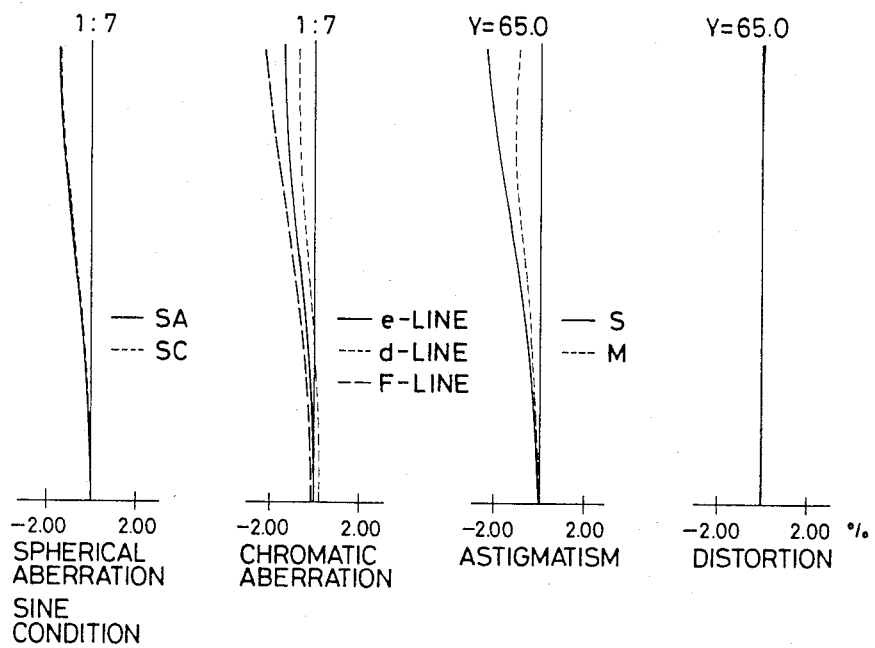
Figure 35:
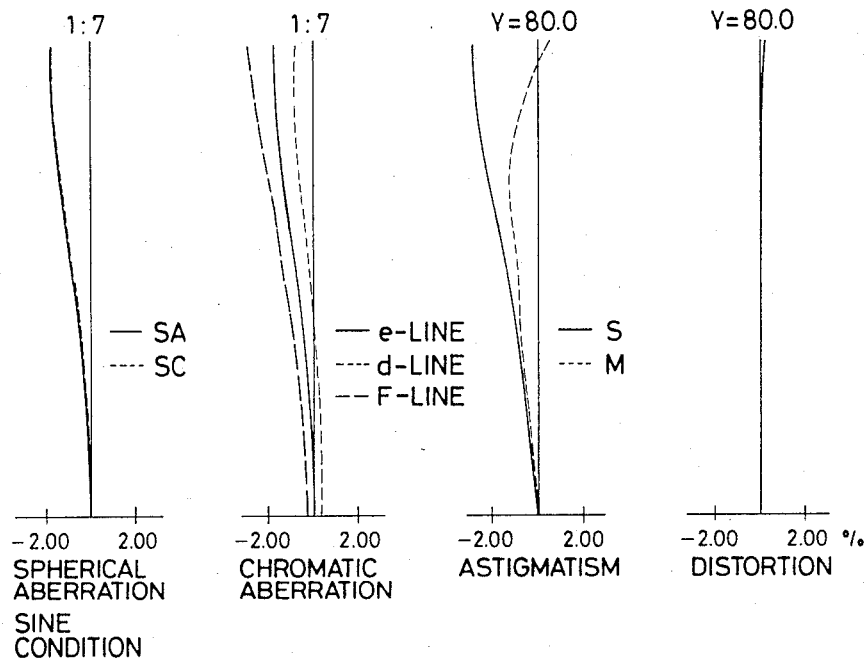
Figure 36:
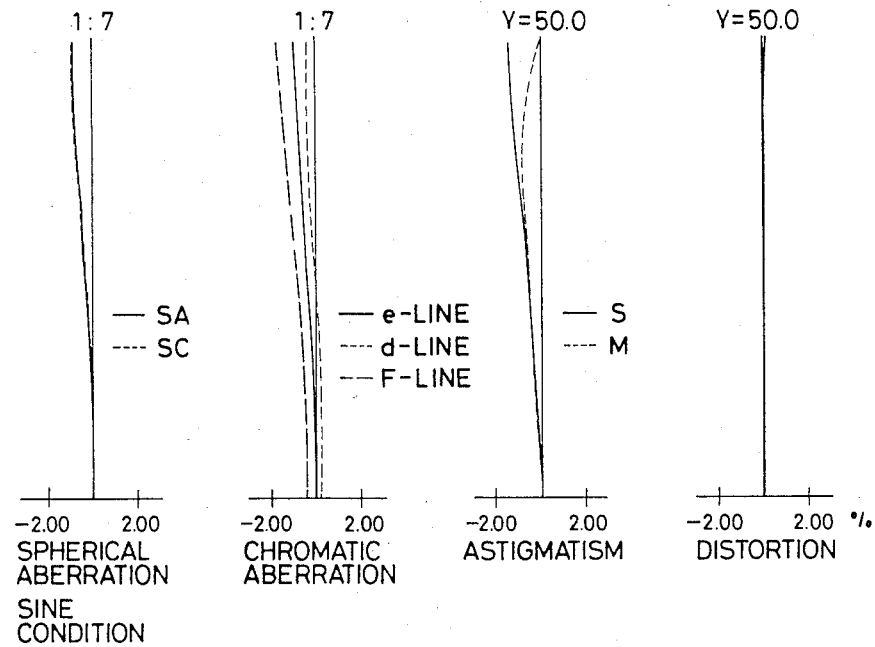
Figure 37:
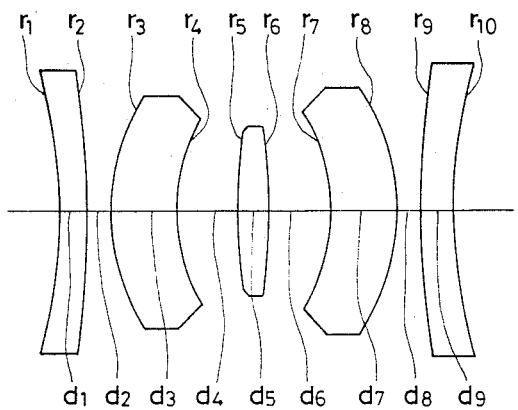
Figure 38:
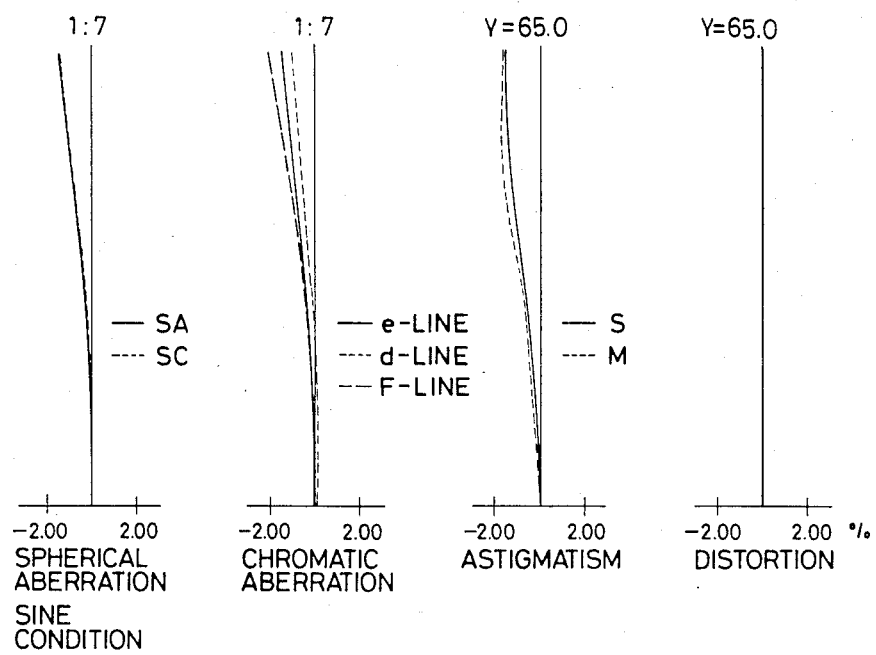
Figure 39:
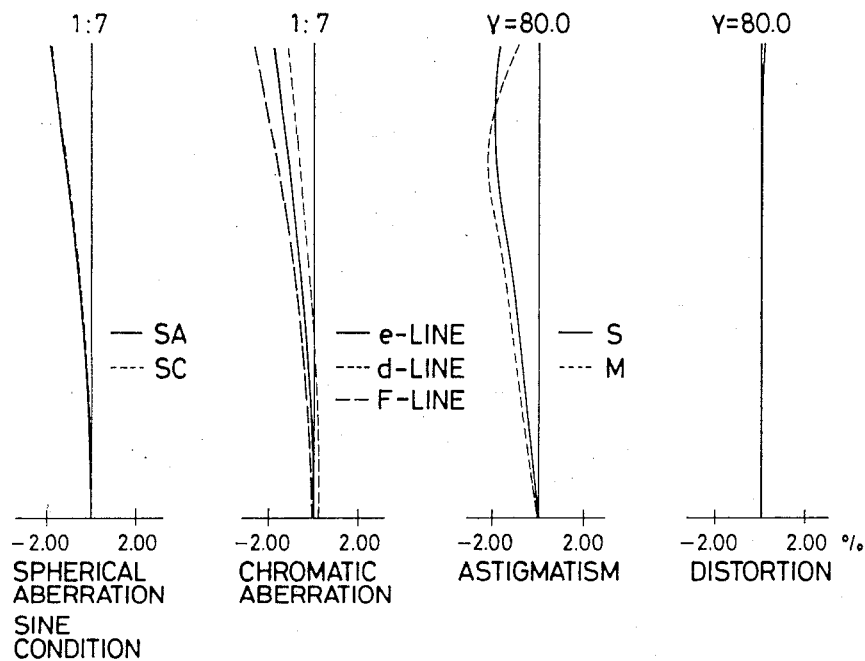
Figure 40:
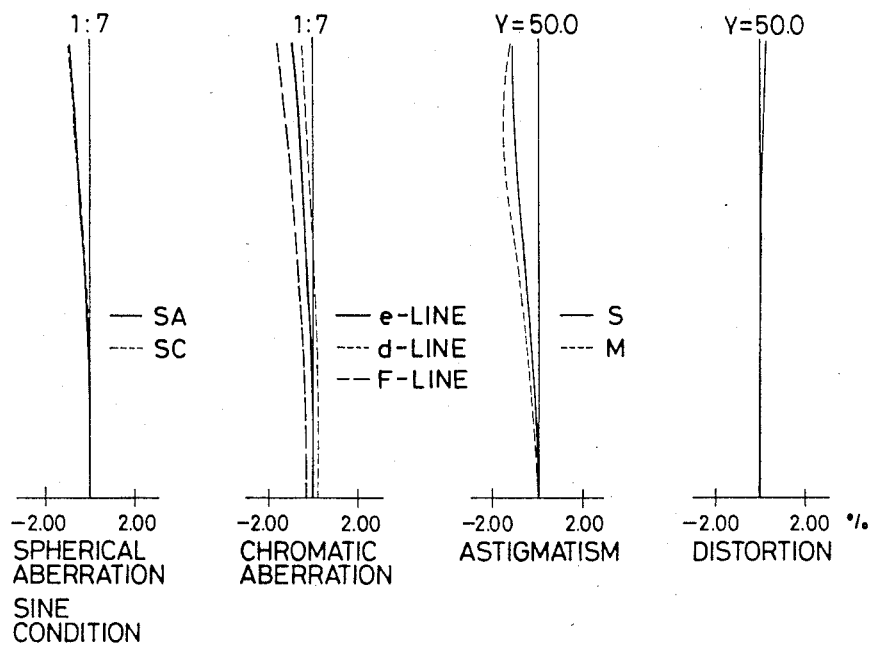

In each set, the first figure, namely FIGS. 1, 5, 9, 13, 17, 21, 25, 29, 33 or 37, shows the structure of the lens system, its radii of curvature $r_i$ and its aerial distances $d_i$.

The remaining figures are all aberrational curves. In each set, the second figure includes four aberrational curves for a magnification of $-1\times$. The first curve plots spherical aberration (SA) and sine condition (SC) as a function of F-number. The second curve plots chromatic aberration for the e-line, d-line and F-line as a function of F-number. The third curve plots astigmatism for the sagittal plane (S) and the meridional plane (M) as a function of radial displacement. The fourth curve plots distortion as a function of radial displacement.

In each set, the third and fourth figures present the same aberrational curves as does the second figure. However, the third figure gives data at a magnification of $-1.25\times$ and the fourth figure gives data at a magnification of $-1.60\times$.

EXAMPLE 1

| i | $r_i$ | $d_i$ | $n_i$ | $\nu_i$ |
|---|---|---|---|---|
| 1 | −46.446 | 1.254 | 1.80518 | 25.4 |
| 2 | −86.176 | 2.000−4.551 | | |
| 3 | 17.200 | 5.080 | 1.83481 | 42.7 |
| 4 | 14.726 | 3.940 | | |
| 5 | 41.158 | 3.185 | 1.67790 | 55.3 |
| 6 | −41.158 | 3.940 | | |
| 7 | −14.726 | 5.060 | 1.83481 | 42.7 |
| 8 | −17.200 | 2.222−5.056 | | |
| 9 | 86.176 | 1.254 | 1.80518 | 25.4 |
| 10 | 46.446 | | | |

$f = 88.470$
$f_1 = f_5 = -1.421f$
$r_1/f = -r_{10}/f = -0.525$
$f_3 = 0.347f$
$r_3/r_4 = r_8/r_7 = 1.168$

EXAMPLE 2

| i | $r_i$ | $d_i$ | $n_i$ | $\nu_i$ |
|---|---|---|---|---|
| 1 | −47.713 | 2.225 | 1.76182 | 26.6 |
| 2 | −90.337 | 2.000−4.860 | | |
| 3 | 17.191 | 5.344 | 1.80440 | 39.6 |
| 4 | 14.654 | 3.916 | | |
| 5 | 40.119 | 3.252 | 1.64000 | 60.1 |
| 6 | −40.119 | 3.916 | | |
| 7 | −14.654 | 5.344 | 1.80440 | 39.6 |
| 8 | −17.191 | 2.222−5.400 | | |
| 9 | 90.337 | 2.225 | 1.76182 | 26.6 |
| 10 | 47.713 | | | |

$f = 87.148$
$f_1 = f_5 = -1.545f$
$r_1/f = -r_{10}/f = -0.547$
$f_3 = 0.364f$
$r_3/r_4 = r_8/r_7 = 1.173$

EXAMPLE 3

| i | $r_i$ | $d_i$ | $n_i$ | $\nu_i$ |
|---|---|---|---|---|
| 1 | −47.701 | 1.800 | 1.74077 | 27.8 |
| 2 | −91.192 | 2.000−4.905 | | |
| 3 | 17.115 | 5.522 | 1.77250 | 49.7 |
| 4 | 14.577 | 4.010 | | |
| 5 | 40.333 | 3.475 | 1.64000 | 60.1 |
| 6 | −40.333 | 4.010 | | |
| 7 | −14.577 | 5.522 | 1.77250 | 49.7 |
| 8 | −17.115 | 2.222−5.445 | | |
| 9 | 91.192 | 1.800 | 1.74077 | 27.8 |
| 10 | 47.701 | | | |

$f = 87.340$
$f_1 = f_5 = -1.561f$
$r_1/f = -r_{10}/f = -0.546$
$f_3 = 0.366f$
$r_3/r_4 = r_8/r_7 = 1.174$

EXAMPLE 4

| i | $r_i$ | $d_i$ | $n_i$ | $\nu_i$ |
|---|---|---|---|---|
| 1 | −47.963 | 3.000 | 1.80518 | 25.4 |
| 2 | −87.548 | 2.000−4.890 | | |
| 3 | 17.041 | 5.200 | 1.83400 | 37.2 |
| 4 | 14.499 | 3.853 | | |
| 5 | 38.985 | 3.113 | 1.62041 | 60.3 |
| 6 | −38.985 | 3.853 | | |
| 7 | −14.499 | 5.200 | 1.83400 | 37.2 |
| 8 | −17.041 | 2.222−5.433 | | |
| 9 | 87.548 | 3.000 | 1.80518 | 25.4 |
| 10 | 47.963 | | | |

$f = 87.193$
$f_1 = f_5 = -1.550f$
$r_1/f = -r_{10}/f = -0.550$
$f_3 = 0.365f$
$r_3/r_4 = r_8/r_7 = 1.175$

EXAMPLE 5

| i | $r_i$ | $d_i$ | $n_i$ | $\nu_i$ |
|---|---|---|---|---|
| 1 | −46.804 | 1.800 | 1.64769 | 33.8 |
| 2 | −99.643 | 2.000−4.909 | | |
| 3 | 17.387 | 5.742 | 1.72600 | 53.6 |
| 4 | 14.815 | 4.163 | | |
| 5 | 39.466 | 2.655 | 1.61800 | 63.4 |
| 6 | −39.466 | 4.163 | | |
| 7 | −14.815 | 5.742 | 1.72600 | 53.6 |
| 8 | −17.387 | 2.222−5.453 | | |
| 9 | 99.643 | 1.800 | 1.64769 | 33.8 |
| 10 | 46.804 | | | |

$f = 88.534$
$f_1 = f_5 = -1.549f$
$r_1/f = -r_{10}/f = -0.529$
$f_3 = 0.364f$
$r_3/r_4 = r_8/r_7 = 1.174$

EXAMPLE 6

| i | $r_i$ | $d_i$ | $n_i$ | $\nu_i$ |
|---|---|---|---|---|
| 1 | −42.953 | 2.465 | 1.80518 | 25.4 |
| 2 | −74.129 | 2.000−4.753 | | |
| 3 | 17.140 | 5.430 | 1.80400 | 46.6 |
| 4 | 14.537 | 4.771 | | |
| 5 | 39.991 | 3.014 | 1.64000 | 60.1 |
| 6 | −39.991 | 4.771 | | |
| 7 | −14.537 | 5.430 | 1.80440 | 46.6 |
| 8 | −17.140 | 2.222−5.280 | | |
| 9 | 74.129 | 2.465 | 1.80518 | 25.4 |
| 10 | 42.953 | | | |

$f = 88.176$
$f_1 = f_5 = -1.478f$
$r_1/f = -r_{10}/f = -0.487$
$f_3 = 0.358f$
$r_3/r_4 = r_8/r_7 = 1.179$

EXAMPLE 7

| i | $r_i$ | $d_i$ | $n_i$ | $\nu_i$ |
|---|---|---|---|---|
| 1 | −41.458 | 1.544 | 1.80518 | 25.4 |
| 2 | −72.482 | 2.000−4.497 | | |
| 3 | 17.112 | 5.473 | 1.77250 | 49.7 |
| 4 | 14.595 | 5.127 | | |
| 5 | 42.744 | 2.136 | 1.69680 | 55.5 |
| 6 | −42.744 | 5.127 | | |
| 7 | −14.595 | 5.473 | 1.77250 | 49.7 |
| 8 | −17.112 | 2.222−4.996 | | |
| 9 | 71.630 | 1.084 | 1.80518 | 25.4 |
| 10 | 41.509 | | | |

$f = 88.661$

-continued

| i | $r_i$ | $d_i$ | $n_i$ | $\nu_i$ |
|---|---|---|---|---|
| | $f_1 = -1.375f$, $f_5 = -1.393f$ | | | |
| | $r_1/f = -0.468$, $-r_{10}/f = -0.468$ | | | |
| | $f_3 = 0.348f$ | | | |
| | $r_3r_4 = r_8/r_7 = 1.172$ | | | |

EXAMPLE 8

| i | $r_i$ | $d_i$ | $n_i$ | $\nu_i$ |
|---|---|---|---|---|
| 1 | −41.222 | 1.411 | 1.80518 | 25.4 |
| 2 | −71.989 | 2.000–4.450 | | |
| 3 | 17.073 | 5.611 | 1.72000 | 50.3 |
| 4 | 14.644 | 5.332 | | |
| 5 | 45.049 | 2.050 | 1.72916 | 54.7 |
| 6 | −45.049 | 5.332 | | |
| 7 | −14.644 | 5.623 | 1.72000 | 50.3 |
| 8 | −17.073 | 2.222–4.953 | | |
| 9 | 71.989 | 1.000 | 1.80518 | 25.4 |
| 10 | 41.222 | | | |
| | $f = 87.789$ | | | |
| | $f_1 = -1.380f$, $f_5 = -1.372f$ | | | |
| | $r_1/f = -r_{10}/f = -0.470$ | | | |
| | $f_3 = 0.354f$ | | | |
| | $r_3/r_4 = r_8/r_7 = 1.166$ | | | |

EXAMPLE 9

| i | $r_i$ | $d_i$ | $n_i$ | $\nu_i$ |
|---|---|---|---|---|
| 1 | −42.568 | 4.892 | 1.78470 | 26.2 |
| 2 | −68.855 | 2.000–5.717 | | |
| 3 | 17.101 | 5.761 | 1.80300 | 46.7 |
| 4 | 14.182 | 4.508 | | |
| 5 | 31.588 | 2.415 | 1.48749 | 70.1 |
| 6 | −31.588 | 4.508 | | |
| 7 | −14.182 | 5.761 | 1.80300 | 46.7 |
| 8 | −17.101 | 2.000–5.717 | | |
| 9 | 69.433 | 4.711 | 1.78470 | 26.2 |
| 10 | 42.626 | | | |
| | $f = 87.519$ | | | |
| | $f_1 = -1.753f$, $f_5 = -1.727f$ | | | |
| | $r_1/f = -0.486$, $-r_{10}/f = -0.487$ | | | |
| | $f_3 = 0.374f$ | | | |
| | $r_3/r_4 = r_8/r_7 = 1.206$ | | | |

EXAMPLE 10

| i | $r_i$ | $d_i$ | $n_i$ | $\nu_i$ |
|---|---|---|---|---|
| 1 | −41.365 | 2.397 | 1.80518 | 25.4 |
| 2 | −71.166 | 2.000–4.898 | | |
| 3 | 16.973 | 5.652 | 1.72916 | 54.7 |
| 4 | 14.410 | 5.257 | | |
| 5 | 41.756 | 2.837 | 1.65160 | 58.5 |
| 6 | −41.058 | 5.257 | | |
| 7 | −14.526 | 5.731 | 1.72916 | 54.7 |
| 8 | −17.078 | 2.000–4.898 | | |
| 9 | 71.033 | 2.949 | 1.80518 | 25.4 |
| 10 | 42.021 | | | |
| | $f = 88.137$ | | | |
| | $f_1 = -1.431f$, $f_5 = -1.505f$ | | | |
| | $r_1/f = -0.469$, $-r_{10}/f = -0.477$ | | | |
| | $f_3 = 0.364f$ | | | |
| | $r_3/r_4 = 1.178$, $r_8/r_7 = 1.176$ | | | |

As described in the foregoing pages, the copying zoom lens system of the present invention that is composed three lens units, negative, positive and negative, reasonably satisfies the requirements for smaller size and lower cost by employing a simple five-group five-element configuration. Notwithstanding this simple construction, the system of the present invention encompasses a half viewing angle of 30° and provides a zoom ratio of at least two by achieving a magnification range of −1.25× to −0.60×. In addition, if the conditions set forth in the foregoing pages are satisfied, a copying zoom lens of superior performance that enables efficient compensation of aberrations can be attained.

What is claimed is:

1. A copying zoom lens system consisting, in order from an object side:

a first lens unit having a negative focal length;
   a second lens unit having a positive focal length; and
   a third lens unit having a negative focal length;
   wherein said lens system achieves zooming by changing both a distance between the first and second lens units, and a distance between the second and third lens units and by displacing said lens system with a distance between an object plane and an image plane being held constant;
   wherein each of said first and third lens units consists of a single negative lens element, and said second lens unit consists of a centrally disposed positive biconvex lens element that is disposed between two meniscus lens elements each having its concave surface directed toward said biconvex lens, said lens system having a five-group five-element configuration.

2. A zooming lens system according to claim 1, wherein said negative lens element of said first lens unit consists of a negative meniscus lens element that has its concave surface directed toward the object side, said negative lens element of said third lens unit consists of a negative meniscus lens element that has its concave surface directed toward the image side, said first and third lens units satisfying the following condition (1):

$$\nu_1, \nu_5 < 40 \quad (1)$$

where $\nu_1$ and $\nu_5$ are the Abbe numbers of the optical materials of which the first and third lens units are respectively made.

3. A copying zoom lens system according to claim 1 wherein said first and third lens units satisfy the following conditions (2) and (3):

$$1.0f < |f_1|, |f_5| < 2.5f (f_1, f_5 < 0) \quad (2)$$

$$-0.70 < r_1/f, -r_{10}/f < -0.37 \quad (3)$$

where f is a focal length of the lens system for a magnification of −1.0×; $f_1$ is a focal length of the first lens unit; $f_5$ is a focal length of the third lens unit; $r_1$ is a radius of curvature of a surface of the first lens unit which is on an object side; and $r_{10}$ is the radius of curvature of a surface of the third lens unit which is on an image side.

4. A copying zoom lens system according to claim 2, wherein said first and third lens units satisfy the following conditions (2) and (3):

$$1.0f < |f_1|, |f_5| < 2.5f (f_1, f_5 < 0) \quad (2)$$

$$-0.70 < r_1/f, -r_{10}/f < -0.37 \quad (3)$$

where f is a focal length of the lens system for a magnification of −1.0×; $f_1$ is a focal length of the first lens unit; $f_5$ is a focal length of the third lens unit; $r_1$ is a radius of curvature of a surface of the first lens unit which is on the object side; and $r_{10}$ is the radius of curvature of a surface of the third lens unit which is on an image side.

5. A copying zoom lens system according to claim 1 wherein said second lens unit satisfies the following conditions (4) to (6):

$$\nu_3 > 46 \quad (4)$$

$$0.45f > f_3 > 0.30f \quad (5)$$

$$1.30 > r_3/r_4, r_8/r_7 > 1.05 \quad (6)$$

where $\nu_3$ and $f_3$ signify an Abbe number and a focal length, respectively, of the positive biconvex lens element; $r_3$ and $r_4$ signify radii of curvature of surfaces on the object and image sides, respectively, of the meniscus lens element that is disposed on the object side of the biconvex lens element; and $r_7$ and $r_8$ signify radii of curvature of surfaces on the object and image sides, respectively, of the mesicus lens element that is disposed on the image side of said biconvex lens element.

6. A copying zoom lens system, according to claim 1: wherein, $r_i$ is the radius of curvature of the i-th lens surface numbered consequently from the object side, $d_i$ is the distance between the i-th and (i+1)-th lens surfaces, $n_i$ and $\nu_i$ are the refractive index and Abbe number, respectively, of the lens having thickness $d_i$, said lens satisfying the following table:

| i | $r_i$ | $d_i$ | $n_i$ | $\nu_i$ |
|---|---|---|---|---|
| 1 | −46.446 | 1.254 | 1.80518 | 25.4 |
| 2 | −86.176 | 2.000−4.551 | | |
| 3 | 17.200 | 5.080 | 1.83481 | 42.7 |
| 4 | 14.726 | 3.940 | | |
| 5 | 41.158 | 3.185 | 1.67790 | 55.3 |
| 6 | −41.158 | 3.940 | | |
| 7 | −14.726 | 5.060 | 1.83481 | 42.7 |
| 8 | −17.200 | 2.222−5.056 | | |
| 9 | 86.176 | 1.254 | 1.80518 | 25.4 |
| 10 | 46.446 | | | |

7. A copying zoom lens system, according to claim 1: wherein, $r_i$ is the radius of curvature of the i-th lens surface numbered consequently from the object side, $d_i$ is the distance between the i-th and (i+1)-th lens surfaces, $n_i$ and $\nu_i$ are the refractive index and Abbe number, respectively, of the lens having thickness $d_i$, said lens satisfying the following table:

| i | $r_i$ | $d_i$ | $n_i$ | $\nu_i$ |
|---|---|---|---|---|
| 1 | −47.713 | 2.225 | 1.76182 | 26.6 |
| 2 | −90.337 | 2.000−4.860 | | |
| 3 | 17.191 | 5.344 | 1.80440 | 39.6 |
| 4 | 14.654 | 3.916 | | |
| 5 | 40.119 | 3.252 | 1.64000 | 60.1 |
| 6 | −40.119 | 3.916 | | |
| 7 | −14.654 | 5.344 | 1.80440 | 39.6 |
| 8 | −17.191 | 2.222−5.400 | | |
| 9 | 90.337 | 2.225 | 1.76182 | 26.6 |
| 10 | 47.713 | | | |

8. A copying zoom lens system, according to claim 1: wherein, $r_i$ is the radius of curvature of the i-th lens surface numbered consequently from the object side, $d_i$ is the distance between the i-th and (i+1)-th lens surfaces, $n_i$ and $\nu_i$ are the refractive index and Abbe number, respectively, of the lens having thickness $d_i$, said lens satisfying the following table:

| i | $r_i$ | $d_i$ | $n_i$ | $\nu_i$ |
|---|---|---|---|---|
| 1 | −47.701 | 1.800 | 1.74077 | 27.8 |
| 2 | −91.192 | 2.000−4.905 | | |
| 3 | 17.115 | 5.522 | 1.77250 | 49.7 |
| 4 | 14.577 | 4.010 | | |
| 5 | 40.333 | 3.475 | 1.64000 | 60.1 |
| 6 | −40.333 | 4.010 | | |
| 7 | −14.577 | 5.522 | 1.77250 | 49.7 |
| 8 | −17.115 | 2.222−5.445 | | |
| 9 | 91.192 | 1.800 | 1.74077 | 27.8 |
| 10 | 47.701 | | | |

9. A copying zoom lens system, according to claim 1: wherein, $r_i$ is the radius of curvature of the i-th lens surface numbered consequently from the object side, $d_i$ is the distance between the i-th and (i+1)-th lens surfaces, $n_i$ and $\nu_i$ are the refractive index and Abbe number, respectively, of the lens having thickness $d_i$, said lens satisfying the following table:

| i | $r_i$ | $d_i$ | $n_i$ | $\nu_i$ |
|---|---|---|---|---|
| 1 | −47.963 | 3.000 | 1.80518 | 25.4 |
| 2 | −87.548 | 2.000−4.890 | | |
| 3 | 17.041 | 5.200 | 1.83400 | 37.2 |
| 4 | 14.499 | 3.853 | | |
| 5 | 38.985 | 3.113 | 1.62041 | 60.3 |
| 6 | −38.985 | 3.853 | | |
| 7 | −14.499 | 5.200 | 1.83400 | 37.2 |
| 8 | −17.041 | 2.222−5.433 | | |
| 9 | 87.548 | 3.000 | 1.80518 | 25.4 |
| 10 | 47.963 | | | |

10. A copying zoom lens system, according to claim 1:

wherein, $r_i$ is the radius of curvture of the i-th lens surface numbered consequently from the object side, $d_i$ is the distance between the i-th and (i+1)-th lens surfaces, $n_i$ and $\nu_i$ are the refractive index and Abbe number, respectively, of the lens having thickness $d_i$, said lens satisfying the following table:

| i | $r_i$ | $d_i$ | $n_i$ | $\nu_i$ |
|---|---|---|---|---|
| 1 | −46.804 | 1.800 | 1.64769 | 33.8 |
| 2 | −99.643 | 2.000−4.909 | | |
| 3 | 17.387 | 5.742 | 1.72600 | 53.6 |
| 4 | 14.815 | 4.163 | | |
| 5 | 39.466 | 2.655 | 1.61800 | 63.4 |
| 6 | −39.466 | 4.163 | | |
| 7 | −14.815 | 5.742 | 1.72600 | 53.6 |
| 8 | −17.387 | 2.222−5.453 | | |
| 9 | 99.643 | 1.800 | 1.64769 | 33.8 |
| 10 | 46.804 | | | |

11. A copying zoom lens system, according to claim 1:

wherein, $r_i$ is the radius of curvature of the i-th lens surface numbered consequently from the object side, $d_i$ is the distance between the i-th and (i+1)-th lens surfaces, $n_i$ and $\nu_i$ are the refractive index and Abbe number, respectively, of the lens having thickness $d_i$, said lens satisfying the following table:

| i | $r_i$ | $d_i$ | $n_i$ | $\nu_i$ |
|---|---|---|---|---|
| 1 | −42.953 | 2.465 | 1.80518 | 25.4 |
| 2 | −74.129 | 2.000−4.753 | | |

-continued

| i | $r_i$ | $d_i$ | $n_i$ | $\nu_i$ |
|---|---|---|---|---|
| 3 | 17.140 | 5.430 | 1.80400 | 46.6 |
| 4 | 14.537 | 4.771 | | |
| 5 | 39.991 | 3.014 | 1.64000 | 60.1 |
| 6 | −39.991 | 4.771 | | |
| 7 | −14.537 | 5.430 | 1.80440 | 46.6 |
| 8 | −17.140 | 2.222–5.280 | | |
| 9 | 74.129 | 2.465 | 1.80518 | 25.4 |
| 10 | 42.953 | | | |

12. A copying zoom lens system, according to claim 1:

wherein, $r_i$ is the radius of curvature of the i-th lens surface numbered consequently from the object side, $d_i$ is the distance between the i-th and (i+1)-th lens surfaces, $n_i$ and $\nu_i$ are the refractive index and Abbe number, respectively, of the lens having thickness $d_i$, said lens satisfying the following table:

| i | $r_i$ | $d_i$ | $n_i$ | $\nu_i$ |
|---|---|---|---|---|
| 1 | −41.458 | 1.544 | 1.80518 | 25.4 |
| 2 | −72.482 | 2.000–4.497 | | |
| 3 | 17.112 | 5.473 | 1.77250 | 49.7 |
| 4 | 14.595 | 5.127 | | |
| 5 | 42.744 | 2.136 | 1.69680 | 55.5 |
| 6 | −42.744 | 5.127 | | |
| 7 | −14.595 | 5.473 | 1.77250 | 49.7 |
| 8 | −17.112 | 2.222–4.996 | | |
| 9 | 71.630 | 1.084 | 1.80518 | 25.4 |
| 10 | 41.509 | | | |

13. A copying zoom lens system, according to claim 1:

wherein, $r_i$ is the radius of curvature of the i-th lens surface numbered consequently from the object side, $d_i$ is the distance between the i-th and (i+1)-th lens surfaces, $n_i$ and $\nu_i$ are the refractive index and Abbe number, respectively, of the lens having thickness $d_i$, said lens satisfying the following table:

| i | $r_i$ | $d_i$ | $n_i$ | $\nu_i$ |
|---|---|---|---|---|
| 1 | −41.222 | 1.411 | 1.80518 | 25.4 |
| 2 | −71.989 | 2.000–4.450 | | |
| 3 | 17.073 | 5.611 | 1.72000 | 50.3 |
| 4 | 14.644 | 5.332 | | |
| 5 | 45.049 | 2.050 | 1.72916 | 54.7 |
| 6 | −45.049 | 5.332 | | |
| 7 | −14.644 | 5.623 | 1.72000 | 50.3 |
| 8 | −17.073 | 2.222–4.953 | | |
| 9 | 71.989 | 1.000 | 1.80518 | 25.4 |
| 10 | 41.222 | | | |

14. A copying zoom lens system, according to claim 1:

wherein, $r_i$ is the radius of curvature of the i-th lens surface numbered consequently from the object side, $d_i$ is the distance between the i-th and (i+1)-th lens surfaces, $n_i$ and $\nu_i$ are the refractive index and Abbe number, respectively, of the lens having thickness $d_i$, said lens satisfying the following table:

| i | $r_i$ | $d_i$ | $n_i$ | $\nu_i$ |
|---|---|---|---|---|
| 1 | −42.568 | 4.892 | 1.78470 | 26.2 |
| 2 | −68.855 | 2.000–5.717 | | |
| 3 | 17.101 | 5.761 | 1.80300 | 46.7 |
| 4 | 14.182 | 4.508 | | |
| 5 | 31.588 | 2.415 | 1.48749 | 70.1 |
| 6 | −31.588 | 4.508 | | |
| 7 | −14.182 | 5.761 | 1.80300 | 46.7 |
| 8 | −17.101 | 2.000–5.717 | | |
| 9 | 69.433 | 4.711 | 1.78470 | 26.2 |
| 10 | 42.626 | | | |

15. A copying zoom lens system, according to claim 1:

wherein, $r_i$ is the radius of curvature of the i-th lens surface numbered consequently from the object side, $d_i$ is the distance between the i-th and (i+1)-th lens surfaces, $n_i$ and $\nu_i$ are the refractive index and Abbe number, respectively, of the lens having thickness $d_i$, said lens satisfying the following table:

| i | $r_i$ | $d_i$ | $n_i$ | $\nu_i$ |
|---|---|---|---|---|
| 1 | −41.365 | 2.397 | 1.80518 | 25.4 |
| 2 | −71.166 | 2.000–4.898 | | |
| 3 | 16.973 | 5.652 | 1.72916 | 54.7 |
| 4 | 14.410 | 5.257 | | |
| 5 | 41.756 | 2.837 | 1.65160 | 58.5 |
| 6 | −41.058 | 5.257 | | |
| 7 | −14.526 | 5.731 | 1.72916 | 54.7 |
| 8 | −17.078 | 2.000–4.898 | | |
| 9 | 71.033 | 2.949 | 1.80518 | 25.4 |
| 10 | 42.021 | | | |

* * * * *